(12) United States Patent
Azar et al.

(10) Patent No.: US 8,856,114 B2
(45) Date of Patent: *Oct. 7, 2014

(54) RANKING RESULTS OF MULTIPLE INTENT QUERIES

(75) Inventors: Joseph Yossi Azar, Redmond, WA (US); Xiaoxin Yin, Bothell, WA (US); Iftah Gamzu, Rishon Lezion (IL)

(73) Assignee: Microsoft Corporation, Redmond, WA (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/336,110

(22) Filed: Dec. 23, 2011

(65) Prior Publication Data

US 2012/0096000 A1    Apr. 19, 2012

Related U.S. Application Data

(63) Continuation of application No. 12/473,376, filed on May 28, 2009, now Pat. No. 8,103,667.

(51) Int. Cl.
*G06F 7/00* (2006.01)
*G06F 17/30* (2006.01)

(52) U.S. Cl.
CPC .... *G06F 17/30867* (2013.01); *G06F 17/30029* (2013.01); *G06F 17/30979* (2013.01); *G06F 17/30035* (2013.01); *G06F 17/30731* (2013.01)
USPC ......................................................... 707/732

(58) Field of Classification Search
CPC .................... G06F 17/30029; G06F 17/30035; G06F 17/30867; G06F 17/30979
See application file for complete search history.

(56) References Cited

U.S. PATENT DOCUMENTS

| | | | |
|---|---|---|---|
| 6,327,590 B1 * | 12/2001 | Chidlovskii et al. | .......... 707/734 |
| 6,507,829 B1 | 1/2003 | Richards et al. | |
| 2006/0271531 A1 | 11/2006 | O'Clair et al. | |
| 2007/0112768 A1 | 5/2007 | Majumder | |
| 2007/0118512 A1 | 5/2007 | Riley et al. | |
| 2007/0136281 A1 | 6/2007 | Li et al. | |
| 2008/0114751 A1 | 5/2008 | Cramer et al. | |

FOREIGN PATENT DOCUMENTS

WO    2008012834 A2    1/2008

OTHER PUBLICATIONS

Nettleton et al., "Analysis of Web Search Engine Query Sessions", WEBKDD '06, Aug. 2006, ACM.*
Nettleton et al., "Analysis of Web search Engine Query Session and Clicked Docuements", WebKDD 2006, LNAI 4811, pp. 207-226, 2007, Springer-Verlag Berlin Heidelberg.*

(Continued)

*Primary Examiner* — Michael Hicks
(74) *Attorney, Agent, or Firm* — Sandy Swain; Judy Yee; Micky Minhas

(57) ABSTRACT

Techniques and systems are disclosed providing improved ranking of results to an online search-based query. One or more user types are identified for a search-based query, and may correspond to a number of user relevant results, and which user results are selected. A user profile can be determined for the respective user types for the search-based query, which may identify a proportion of the users that belong to that type, and how many results are relevant to that type. A set of relevant results can be identified for the respective user types for the search-based query, based on a number of results used by the user type. An improved ranking of the results can be determined for the search-based query, from the one or more sets of relevant results, based on user profiles and a desired user satisfaction metric for a desired number of users.

20 Claims, 7 Drawing Sheets

(56) References Cited

OTHER PUBLICATIONS

Nettleton et al., "Analysis of web search Engine Clicked Documents", LA-WEB'06, 2006, IEEE.*
Gowan, "A Multiple Model Approach to Personalized Information Access", Thesis: University College Dublin—Computer Science Department, Feb. 2003.*
"Ranking User's Relevance to a Topic through Link Analysis on Web Logs", Jidongwant, Zheng Chen, Li Tao, Wei-Ying Ma and Liu Wenyin, Nov. 2002, reprinted from the Internet at: https://research.microsoft.com/en-us/people/zhengc/widm2002_rankinguser.pdf,6 pgs.
"A Vector Based Algorithm for Semantic Web Services Ranking", Omid Mola, Peyman Emamian, and Mohammadreza Razzazi, Apr. 11, 2008, Published in: 3rd International Conference on Information and Communication Technologies: From Theory to Applications, 2008. ICTTA 2008, 5 pgs.
Microsoft's UserRank—Query Independent Ranking Based Upon User Logs, William Slawski, May 20, 2007, reprinted from the Internet at: http://seobythesea.com/?p=632, 2 pgs.
"Calculating Search Rankings with User Web Traffic Data", William Slawski, May 19, 2007, reprinted from the Internet at: http://seobythesea.com/?p=634, 6 pgs.
"PageRank", Wikipedia, Feb. 2014, reprinted from the Internet at: http;//en.wikipedia.org/wiki/PageRank, 11 pgs.
"Re-Ranking Search Results Using Query Logs", Ziming Zhuang and Silviu Cucerzan, Nov. 5-11, 2006, reprinted from the Internet at: http://research.microsoft.com/en-us/people/silviu/cikm06.pdf, pp. 860-861.
"Improving Web Search Ranking by Incorporating User Behavior Information", Eugene Agichtein, Eric Brill and Susan Dumais, Aug. 6-11, 2006, reprinted from the Internet at: http://research.microsoft.com/en-us/um/people/sdumais/sigir2006-fp345-ranking-agichtein.pdf, 8 pgs.
"Adaptive Ordering of Pipelined Stream Filters", Shivnath Babu, Rajeev Motwani, Kamesh Munagala, Itaru Nishizawa and Jennifer Widom, Jun. 13-18, 2004, reprinted from the Internet at: http://ilpubs.stanford.edu/621/1/2003-69.pdf, 12 pgs.
"On Chromatic Sums and Distributed Resource Allocation", Amotz Bar-Noy, Mibir Bellare, Magmis M. Halldorsson, Hadax Shachnai and Tami Tamir, 1998, reprinted from the Internet at: http://citeseerx.ist.psu.edu/viewdoc/download?doi=10.1.1.47.2776&rep=rep1&type=pdf, 23 pgs.
"Identifying Ambiguous Queries in Web Search", Ruihua Song, Zhenxiao Luo, Ji-Rong Wen, Yhong Yu and Hsiao-Wuen Hon, May 8-12, 2007, Published in: · Proceeding WWW '07 Proceedings of the 16th international conference on World Wide Web, ACM New York, NY, pp. 1169-1170.
"A Matched Approximation Bound for the Sum of a Greedy Coloring", Amotz Bar-Noy, Magnus M. Halldorsson and Guy Kortsarz, Jun. 16, 1998, reprinted from the Internet at: http://crab.rutgers.edu/~guyk/pub/mcs/nabs.pdf, pp. 1-7.
"Efficient Sequences of Trials", Edith Cohen, Amos Fiat and Haim Kaplan, 2003, Published in: Proceedings of the fourteenth annual ACM-SIAM symposium on Discrete algorithms, 10 pgs.

"A User Brosing Model to Predict Search Engine Click Data from Past Observations", Georges Dupret and Benjamin Piwowarski, Jul. 24, 2008, preprinted from the Internet at: https://www.google.com/search?sourceid=navclient&aq=&oq=a+user+browsing+model+to+predict+search+engine+click+data+from+past+observations&ie=UTF-8&rlz=1T4ADRA_enUS455US456&q=a+user+browsing+model+to+predict+search+engine+click+data+from+past+observations&gs_l=hp...0.0.0.0.11156..........0.-8_S6uj5UtA, pp. 331-338.
"Approximating Min-sum Set Cover", Uriel Feige, Laszlo Lovasz and Prasad Tetali, 2002, Approximation Algorithms for Combinatorial Optimization, Lecture Notes in Computer Science, vol. 2462, 18 pgs.
Faster and Simpler Algorithms for Multicommodity Flow and other Fractional Packing Problems, Naveen Garg and Jochen Konemann, Nov. 8-11, 1998, Published in: 39th Annual Symposium on Foundations of Computer Science, pp. 10 pgs.
"An Approximation Algorithm for the Minimum Latency Set Cover Problem", Refael Hassin and Asaf Levin, 2005, Algorithms—ESA, Lecture Notes in Computer Science, vol. 3669, 8 pgs.
"Determining the Informational, Navigational, and Transactional Intent of Web Queries", Bernard J. Jansen, Danielle L. Booth and Amanda Spink, Sep. 11, 2007, Information Processing and Management 44, 16 pgs.
"Evaluating the Accuracy of Implicit Feedback from Clicks and Query Reformulations in Web Search", Thorsten Joachims, Laura Granka, Bing Pan, Helene Hembrooke, Filip Radlinski and Geri Gay, Apr. 2007, ACM Transactions on Information Systems, vol. 25, No. 2, Article 7, 26 pgs.
"Learning with Attribute Costs", Haim Kaplan, Eyal Kushilevitz and Yishay Mansour, May 22-24, 2005, Proceeding, STOC '05 Proceedings of the thirty-seventh annual ACM symposium on Theory of computing, 10 pgs.
"The Pipelined Set Cover Problem", Kamesh Munagala, Shivnath Babu, Rajeev Motwani and Jennifer Widom, 2005, Proceeding ICDT'05 Proceedings of the 10th international conference on Database Theory 16 pgs.
"Structure of a Simple Scheduling Polyhedron", Maurice Queyranne, Feb. 10, 1988, Mathematical Programming 58, North-Holland, 23 pgs.
"Scheduling to Minimize Total Weighted Completion Time: Performance Guarantees of LP-Based Heuristics and Lower Bounds", Andreas S. Schulz, 1995, Proceedings of the 5th International IPCO Conference, Lecture Notes in Computer Science 1084, 16 pgs.
"The Maximum Concurrent Flow Problem", Farhad Shahrokhi and D.W. Matula, Apr. 1990, Journal of the Association for Computing Machinery, vol. 37, No. 2, 17 pgs.
"Analysis of Web Search Engine Query Sessions", David Nettleton, Liliana Calderon-Benavides and Ricardo Baeza-Yates, Aug. 20, 2006, WEBKDD '06, Philadelphia, Pennsylvania, ACM, 10 pgs.
"A Multiple Model Approach to Personalised Information Access", John Paul McGowan, Feb. 2003, Thesis: University College Dublin—Computer Science Department, 78 pgs.

* cited by examiner

RANKING RESULTS OF MULTIPLE INTENT QUERIES

RELATED APPLICATIONS

This application is a continuation of U.S. application Ser. No. 12/473,376, filed on May 28, 2009, entitled "RANKING RESULTS OF MULTIPLE INTENT QUERIES", at least some of which may be incorporated herein.

BACKGROUND

The Internet is often used to find content of particular interest to users, such as relevant news articles, research topics, videos, and other content. When a user searches for content (e.g., they do not know an exact location for the desired content) they typically utilize web-based search engines, situated on search-based websites. Search engines index web-content and return results, such as links to content-based websites, to users based on a query posed by a user. Often, the user's query is broken down into keywords and the search-engine's index is searched for documents, such as web-pages, that may contain one or more of the keywords. Commonly, certain queries are posed by a plurality of users over and over again. Search-engines can collect data for the respective queries, such as which results the user selected, how many results the user selected, and which positions were the results that the user selected. This information can be stored and used to analyze user use patterns for search-engines, and the queries that are posed.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While a plurality of disparate users may pose a same or similar query, such as to a search-engine, an intent for that query may not be the same for the respective users. For example, even a fairly non-ambiguous query term, such as "Hong-Kong," can have multiple intents, such as travel to Hong-Kong, attractions in Hong-Kong, maps for Hong-Kong, business in Hong-Kong, and much more. A preferred query results ranking system may be able to provide results for the respective major intents for a query. Further, a preferred ranking can provide quick reference and satisfaction for a majority of the users.

Prior ranking techniques utilize document content comparison with keywords matches from the query. For example, where a document (e.g., web-page) has ten references to "Hong-Kong," it may be ranked higher than one that only has five references to "Hong-Kong." However, content does not equate to intent. Further, preferences have been inferred and re-ranked based on user clicks, from data collected by a search-engine. However, these prior techniques assume that different users have a same preference for the resulting web-pages returned, that is, they have a same intent for the query.

Techniques and systems are disclosed that provide for an improved re-ranking of results for a query, that cover a desired portion of intents of the query (e.g., optimized for a majority of users), and can mitigate efforts by respective users of the query in finding the results that satisfy their needs. For example, where one type of user of the query is merely looking for one web-page that covers their content needs, a higher ranking of this result can lessen the time needed for the user to scan and select the result.

In one embodiment, where improved ranking of results to an online search-based query can be provided, one or more user types are identified for a search-based query, for example, where a user type corresponds to a number of relevant results selected and which ones are selected for the query. Further, a user profile can be determined for the respective user types, for example, which helps identify a proportion of the users that belong to that type, along with how many results are relevant to that type. Additionally, a set of relevant results can be identified for the respective user types for the query, which can be based on a number of results used by the user type to complete their intended task, for example. An improved ranking of the results can be determined for the query, from the one or more sets of relevant results, which may be based on the user profiles and a desired (e.g., optimized) user satisfaction metric for a desired number (e.g., majority) of users.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
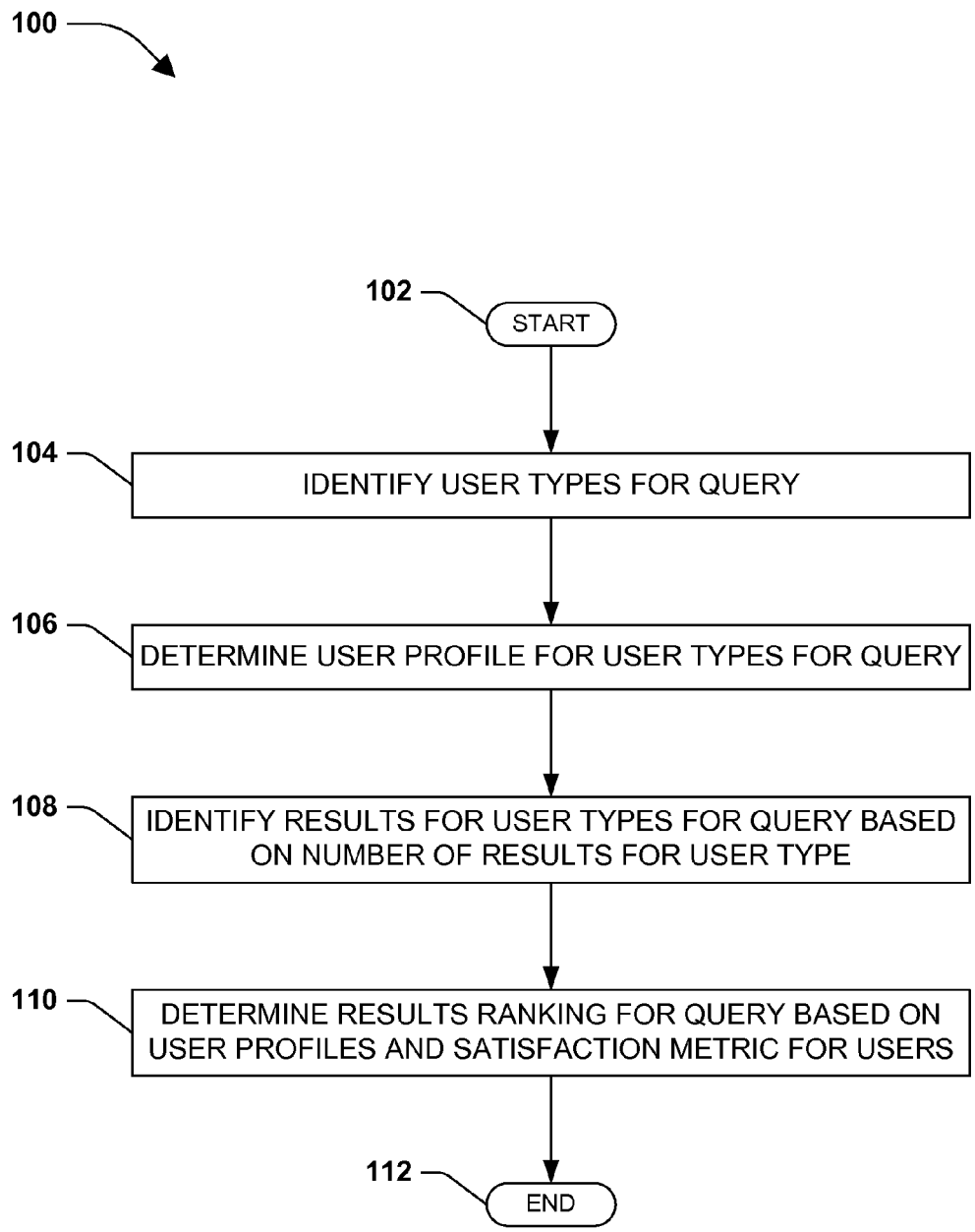
FIG. 1 is a flow-chart diagram of an exemplary method for providing an improved ranking of results to an online search-based query.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for providing a ranking of results for queries that may have multiple intents, such as "cardinals", which could refer to baseball, football, catholic church, birds, or an ordering of numbers. A position of respective results, for example, can attempt to satisfy a desired number of users (e.g., most) in a desired amount of time (e.g., quickest). FIG. 1 is a flow-chart diagram of an exemplary method 100 for providing an improved ranking of results to an online search-based query.

The exemplary method 100 begins at 102 and includes identifying one or more user types for a search-based query, at 104, such as a user query on a web-based search-engine. In one embodiment, there can exist a plurality of types of users, respectively interested in some subset of search results returned from a query. For example, when a query is made a user's intent for the query is often not known. In this example, one type of users may select merely one result and be satisfied, while others may select two or more until they are satisfied.

In one embodiment, user types may be characterized by a type and/or amount of results they select. In this embodiment, users can be grouped into types by how many results the user selects to perform their desired task for the query, and/or which results the user selects to perform their desired task for the query. For example, user types for a query may include, but are not limited to, "only click" where a user selects merely one result (e.g., merely a fourth result selected); "first-click" where the user selects a first result in a ranking of results (e.g., also second-click, third-click, etc.); and "last-click" where a user type can be characterized not only by the result selected that meets their needs (e.g., last results selected), but also a number of results selected until they reached the "last-click" (e.g., three total results selected with the fifth ranked result being the last one selected).

At 106, in the exemplary method 100, a user profile is determined for the respective user types for the query. In one embodiment, the respective user types can have a non-negative profile vector, which may be determined based on a number of relevant results that the user selects to perform their desired task (e.g., one user type may select three results).

In another embodiment, the profile vector may also be based on a probability distribution for the user type, where the probability distribution represents a proportion of users of that user type in the population of users for the query (e.g., twenty-percent of the users are "first-click" users). For example, a user profile vector may be weighted by the probability distribution for the user type, and have a length equivalent to the number of results selected by the user type.

At 108, in the exemplary method 100, a set of relevant results for the query is identified for the respective user types, which is based on a number of results utilized by the user type. In one embodiment, the number of relevant results for a user type can be based on the user profile, which identifies how many results the users of that type utilize in order to complete their task.

For example, a query may return ten results from an online search-engine. In this example, of the ten results, merely those results that the users selects until they are satisfied (e.g., relevant results) can be assigned to the set for that user type (e.g., where a user types selects a first, third and fourth result, these results can be assigned to the user-type set of relevant results). In this embodiment, the set of relevant results comprises a subset of the results returned for the query.

At 110, in the exemplary method 100, a ranking of results is determined for the query, comprised of the relevant results from the one or more sets of relevant results (e.g., the user-type sets, which are subsets of results returned for the query). In this exemplary method, the determination is based on the user profiles for the respective user types and a desired user satisfaction metric for a desired number of users. For example, for a query having multiple intents (e.g., a query for "giant" may refer to a bicycle company, a food store chain, a movie, or other references) the results ranking can provide results for a large portion of those common intents for the users, in an order that allows the users from the respective user types to perform their desired tasks in satisfactory manner (e.g., optimized to allow a largest proportion of users to select their relevant results in a fastest time).

In one embodiment, the user profiles can facilitate determining the results rankings by using their respective weights, as a function of a proportion of users that select a result to perform their desired task for the query. For example, where a first result may be relevant to forty-percent of the users, and a second result may be relevant to thirty-percent of the users, the first result may be ranked higher than the second result.

In another embodiment, a user satisfaction metric can be used to determine the results rankings, where the satisfaction metric measures a satisfaction weight for the users. In this embodiment, the satisfaction weight can be a function of a desired number of users selecting a result to perform their desired task for the query in a desired amount of time. For example, where a third result is a "last-click" selection (e.g., a last selection of the respective relevant results from the user-type set) for twenty-percent of the users, and a fourth result is the "last-click" selection for fifteen-percent of the users, the third result may be ranked higher than the second result.

Having determined the ranking of the results for the search-based query, the exemplary method 100, of FIG. 1, ends at 112.

Figure 2:
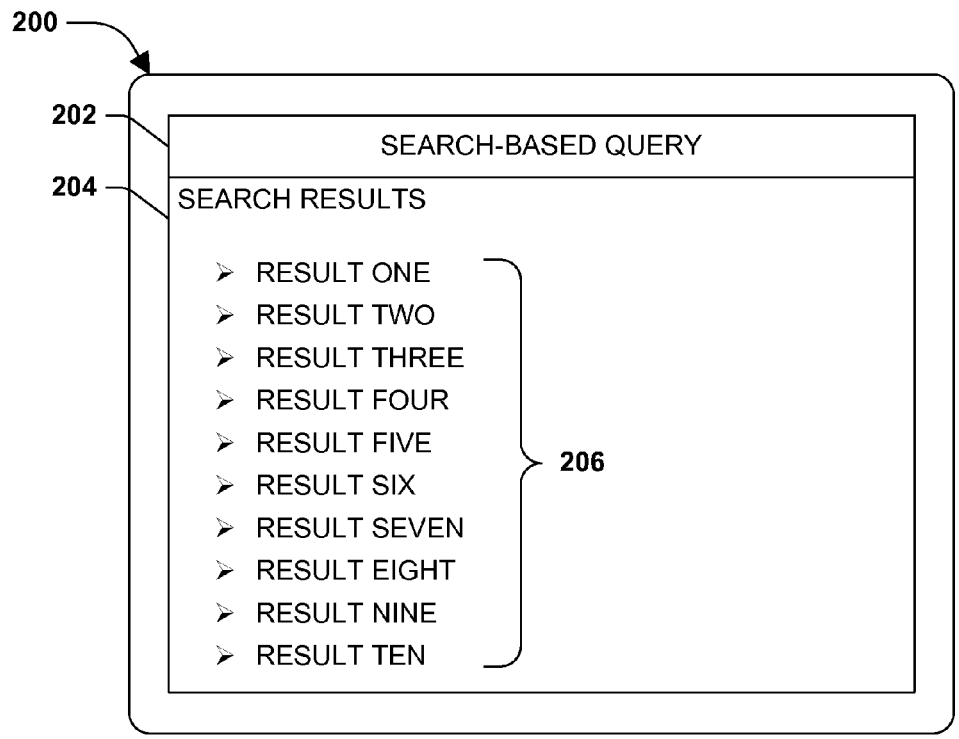
FIG. 2 is an illustration of an exemplary environment where one or more of the methods and/or systems described herein may be implemented.

FIG. 2 is an illustration of an exemplary environment 200 where one or more of the methods and/or systems described herein may be implemented. In one embodiment, the exemplary environment 200 may comprise a search-based website that provides a search-engine for users to find results 204 for a query 202, such as returning links to websites as results 204 to a query 202 for some content on the Internet. In this exemplary environment, the search results 204 are ranked 206, which can be based on a variety of factors. For example, common rankings are determined by matching keywords from the query 202 and ranking 206 the results 204 based how relevant the contents of the results are to the keywords of the query.

Figure 3:
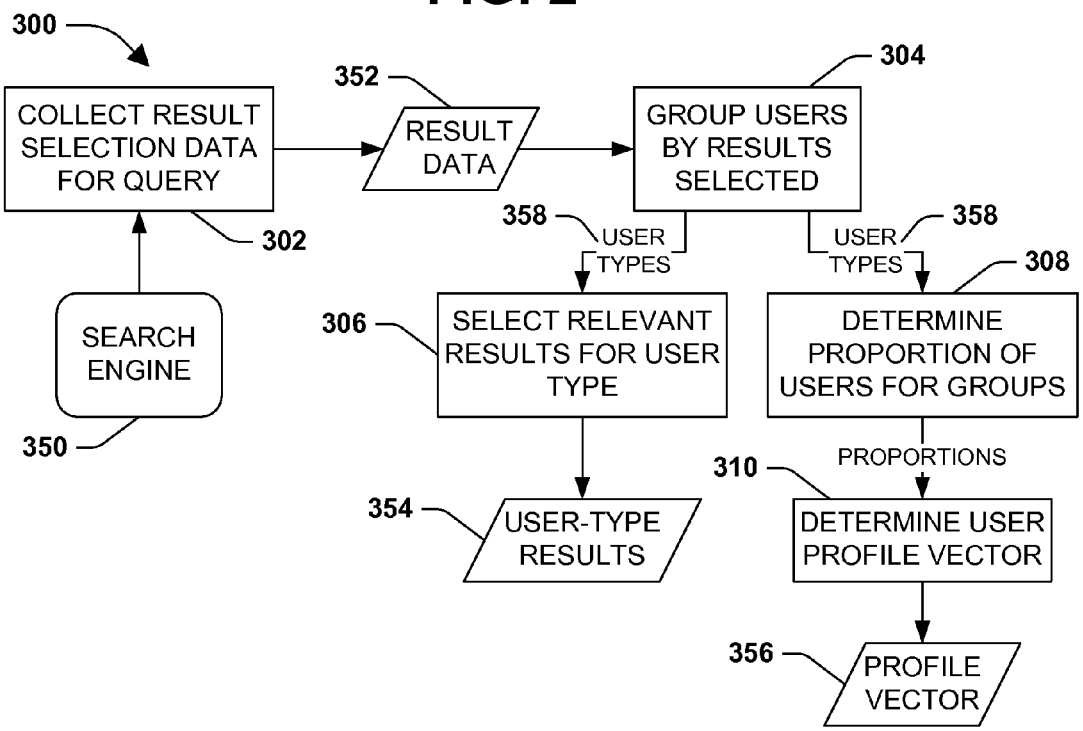
FIG. 3 is a flow-chart diagram illustrating one embodiment of a portion of a method, where user profiles and sets of user-type relevant results can be determined.

FIG. 3 is a flow-chart diagram illustrating one embodiment 300 of a portion of a method, where user profiles and sets of user-type relevant results can be determined. In this embodiment 300, a search-engine 350 is employed to collect results selection data for a query, at 302. For example, large, Internet-based search engines typically collect data that indicates which of the returned results were selected by users of the search-engine, for various queries. In this embodiment, the results selection data 352 can be used to group users by the results they selected for a particular query.

As an example, in the exemplary environment 200 of FIG. 2, a plurality of users may pose a same (or similar) query 202 to the search engine 200, and a set of same (or similar) results 204 may be returned for that query 202. Various users of the query may select a variety of results, for example, based on their intent, such as to complete a desired task. A first group of users may merely select result one in the rank 206, and be satisfied (e.g., finish using the search engine for that query); a second group of users may select result two and four; a third group of users may merely select results one, four, and eight, while a fourth group of users may select each of the ten results.

In this example, the user types can comprise: type A, a "first-click"/"only-click" type, having selected only result one; type B, a "two-click"/"last-click result four" type, having selected two results with result four as the last one selected; type C, an "three-click"/"last-click result eight" type; and type D, an "all-click"/"last-click result ten" type. At 306, in FIG. 3, relevant results 354 can be selected for the user types 358. For example, a set of relevant results 354 for type A may comprise merely result one in the rankings 206, of FIG. 2, while type B's set 354 can comprise results two and four, etc.

Further, the user types 358 can comprise data that identifies how many users belong to the respective user types. At 308, in FIG. 3, the proportions of user for the user-types can be determined. For example, type A may comprise forty-percent of the users, type B may comprise thirty-percent, type C may comprise twenty-percent, and type D may comprise ten-percent of the users that used the query.

At 310, the proportions for the user types can be used to determine a user profile vector 356 for the user type. In one embodiment, as described above, the proportions can be used to weight the respective user profile vectors, for example, by giving more weight to user types that comprise a larger portion of the users of the query. In another embodiment, as described above, the profile vector can also have a length that is determined by a number of results selected by a user type. For example, type A may have a profile vector of length one, having a forty-percent weight; type two may have a profile vector of length two, having a weight of thirty-percent; etc.

Figure 4:
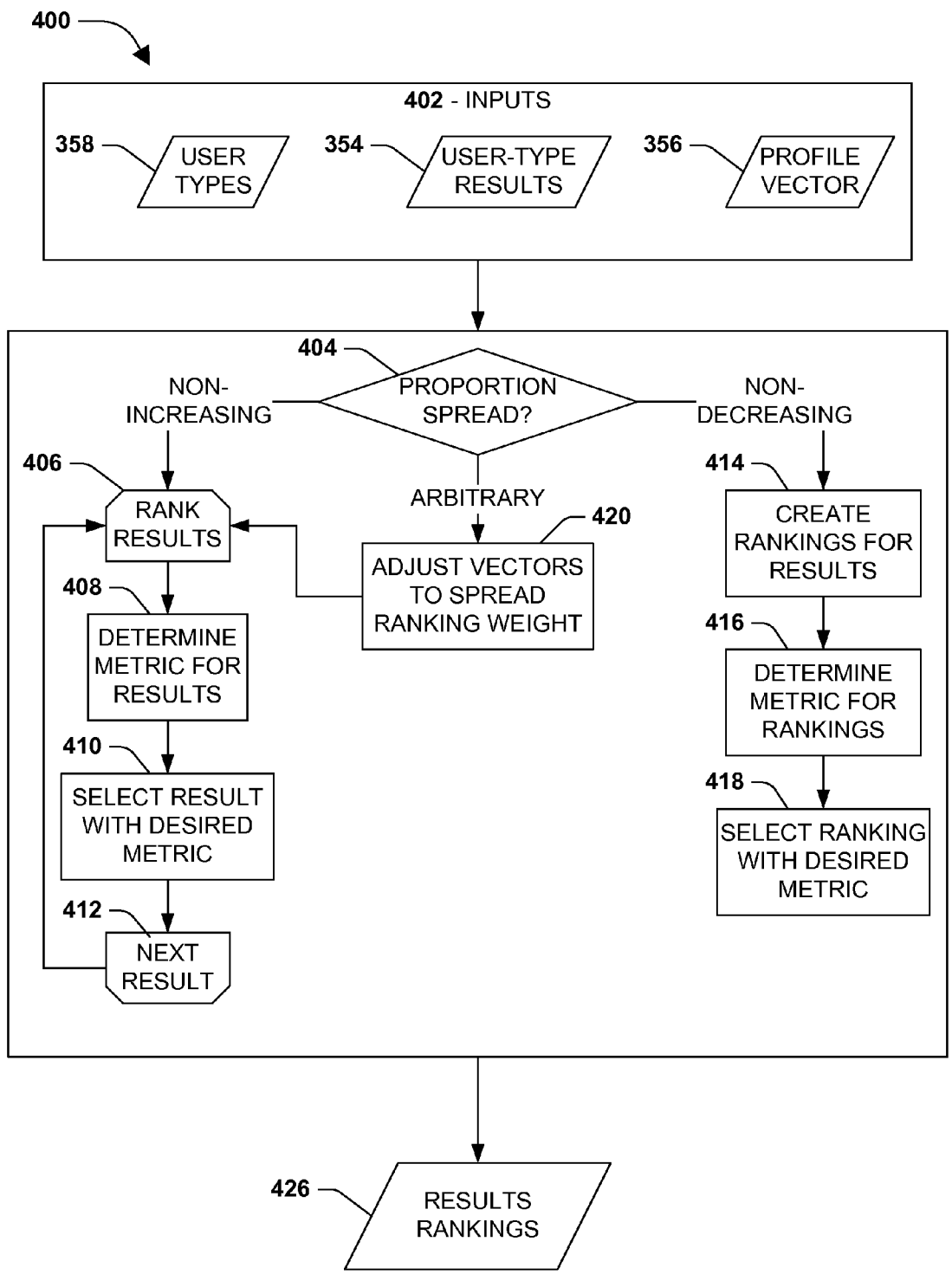
FIG. 4 is a flow-diagram illustrating one embodiment of a portion of a method where query result rankings are determined.

FIG. 4 is a flow-diagram illustrating one embodiment 400 of a portion of a method where query result rankings are determined. The inputs 402 comprise the user types 358, a user-type set of relevant results 354 for the respective user types, and a profile vector 356 for the respective user types. In this embodiment 400, at 404, a weighted spread of the proportions for the respective user types is determined, for example, based on their respective user-profile vectors.

For example, as described above, a user-profile vector can comprise a weight factor corresponding to a proportion of users in that type, and a length factor corresponding to a number of relevant results in the set of result for that type. In one embodiment, the weighted spread of proportions for the user types can correspond to the respective vector lengths from low to high. For example, as described above in FIG. 2, a weighted spread of proportions can comprise the user types: type A, of vector length one; type B of vector length two; type C, of vector length three; and type D, of vector length ten. Accordingly, the proportion spread can be: type A, forty-percent; type B, thirty percent; type C, twenty percent; and type D, ten percent.

At 406 in the exemplary embodiment 400, if the weighted proportion spread is non-decreasing, as in the above example (e.g., going from forty-percent down to ten percent across the weighted spread), the relevant results 354 for the respective user-types can be ranked. At 408, a satisfaction metric can be determined for the respective results. In one embodiment, as described above, the satisfaction metric can be based on a user satisfaction weight that is a function of a desired number of users selecting a result to perform their desired task for the query in a desired amount of time.

For example, as described above in FIG. 2, result one was selected by types A, C, and D; result four was selected by user-types B, C, and D; result two was selected by types B and D; result eight was selected by types C and D, and the remaining results were merely selected by type D. Further, a proportion of users that selected the result can also be assigned to the result, for example, where seventy-percent of the users (e.g., type A, forty-percent; type C, twenty-percent; and type D, ten-percent) have result one in their set of relevant results.

Further, the satisfaction metric provides for a desired number of users selecting a result to perform their desired task for the query in a desired amount of time. In one embodiment, the user satisfaction weight can be a function of the respective user types to be able to complete their desired tasks, for example, where type A selects one result, and type D selects all ten results. Therefore, type A may be satisfied after merely selecting result one, whereas type ten may not be satisfied until all ten results are selected. In this embodiment, the users being able to complete their tasks (e.g., having the respective results in their user-type set ranked) can be combined with the proportion of users for which the result is relevant, can determine a satisfaction weight for the result.

A 410 in the exemplary embodiment 400, the result having a desired (e.g., optimal or highest) satisfaction metric is selected to be ranked next. A first time through the 406-412 loop can yield a first ranked result, while a second time through can yield a second ranked result, etc. As an example, if forty-percent of the users are satisfied after result one is selected (type A), along with some of the needs for thirty-percent of the remaining users (types C and D), result one (206 in FIG. 2) may have a desired satisfaction metric (e.g., highest) and be ranked first.

At 412, a next result is ranked, looping back to 406. A satisfaction metric can be determined for the results that have not yet been ranked, at 408. For example, none of the remaining results (in FIG. 2) can complete a set of relevant results for a user-type; therefore, a next-best result can be determined by the satisfaction metrics. While result two is relevant to forty-percent (types B and D) of the user, result four is relevant to sixty-percent of the users (types B, C, and). In this example, result four may have a higher satisfaction metric that result two, so it can be selected, at 410. In one embodiment, a type of weight-reduction greedy algorithm may be applied in the 406-412 loop that selects respective results based on weights, as described above.

If the proportion spread is determined to be non-decreasing, at 404, a plurality of results rankings can be created for results, at 414. In one embodiment, the results can be put in the respective potential orders for a number of relevant results. For example, if there are ten relevant results, there may be $10^{10}$ potential orders of the results. At 416, a satisfaction metric can be determined for the respective rankings, as described above, and the ranking having a desired (e.g., optimal) satisfaction metric can be selected, at 418.

If the proportion spread is determined to be arbitrary (e.g., having no particular order of increasing or decreasing, etc.), at 404, the user-profile vectors can be adjusted to spread their ranking weights in a non-uniform manner, at 420. In one embodiment, an interpolation vector can be produced that approximates the user-profile vector, which can produce values that can be fed into the greedy weight reduction algorithm, for example. After the vectors are adjusted the adjusted vector can be fed into the 406-412 loop for determining a ranking of results.

Figure 5:
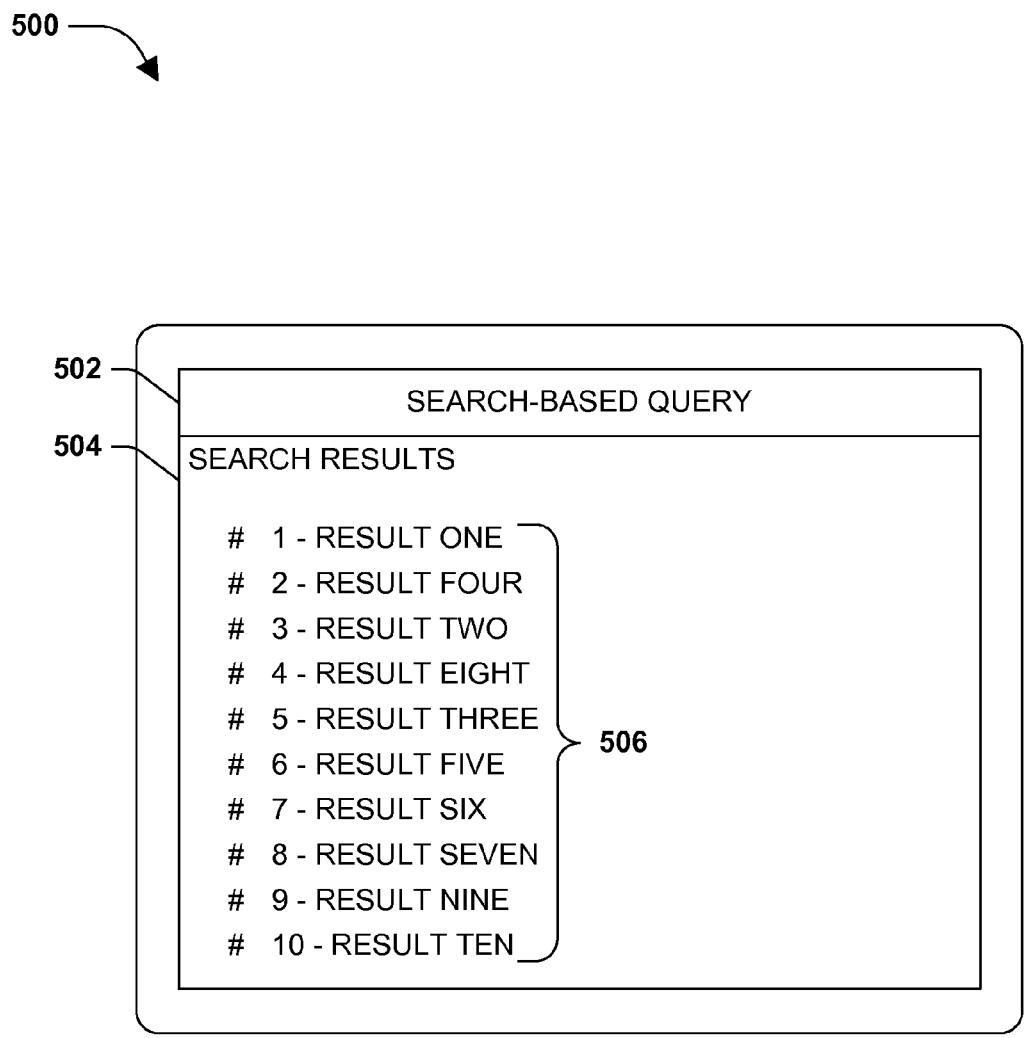
FIG. 5 is an illustration of one embodiment where relevant results have been ranked in accordance with the methods and systems described herein.

In this exemplary embodiment 400, the portion of the method can take the inputs 402 (e.g., from FIG. 3) and produce a ranking of the relevant results 426 for the search-based query. FIG. 5 is an illustration of one embodiment 500 where relevant results have been ranked in accordance with the methods and systems described herein. In this example, a search-engine may have yielded a set of results for a query 502 (e.g., 204 in FIG. 2) having a certain rank (e.g., 206 in FIG. 2). In exemplary embodiment 500, the results 504 for the query 502 can be re-ranked 506 based on the user-profiles and a satisfaction metric, as described above.

In this example, referring back to the discussion of FIG. 2, the results are ranked 506 based on a proportion of users that utilize the respective results in their relevant user-type set of results, and that sue them to complete their desired task. For example, result one is selected by types A, C and D, comprising seventy-percent of users, forty-percent of which complete their desired task by selecting result one. This means that forty-percent of users will be satisfied by selecting the first result.

Results four and two are ranked second and third, respectively, as result four comprises a selection for sixty-percent of the users, and thirty-percent of the users can be satisfied after selecting result two, which takes care of seventy-percent of all users, for example. Result eight is ranked fourth 506, as another twenty-percent of the users can be satisfied by selecting this result. Therefore, for example, ninety-percent of all users can be satisfied in the first four results ranked 506, thereby accounting for them in a very short-amount of time (e.g., time taken to find and select a result). The remaining results can be ranked 506 to account for the remaining ten-percent of users who have all ten results in their set of relevant results.

Figure 6:
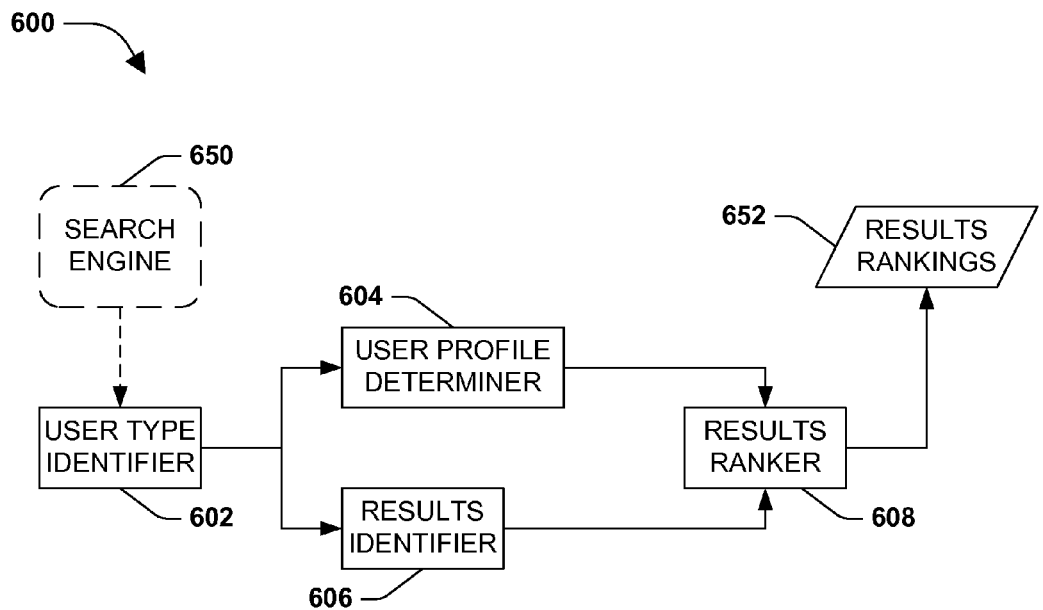
FIG. 6 is a component block diagram of an exemplary system for providing an improved ranking of results to an online search-based query.

A system can be devised that uses search-based results selection data to provide a re-ranking of results. FIG. 6 is a component block diagram of an exemplary system 600 for providing an improved ranking of results to an online search-based query. A user-type identification component 602 identifies one or more user types corresponding to a search-based query, for example, by collecting query result selection data from a search-engine 650. A user profile determination component 604 determines a user profile for the respective user types identified by the user type identification component 602.

A results identifier 606 identifies a set of relevant results for the respective user types identified by the user type identification component 602, where a number of results in the set of relevant results may be determined by the user type. A results ranking component 608 determines a ranking of results 652 for the search-based query, from the one or more sets of relevant results from the results identifier 606. To determine the result ranking 652, the results ranking component 608 uses a function of the user profiles for the respective user types and a function of a desired user satisfaction metric for a desired number of users.

Figure 7:
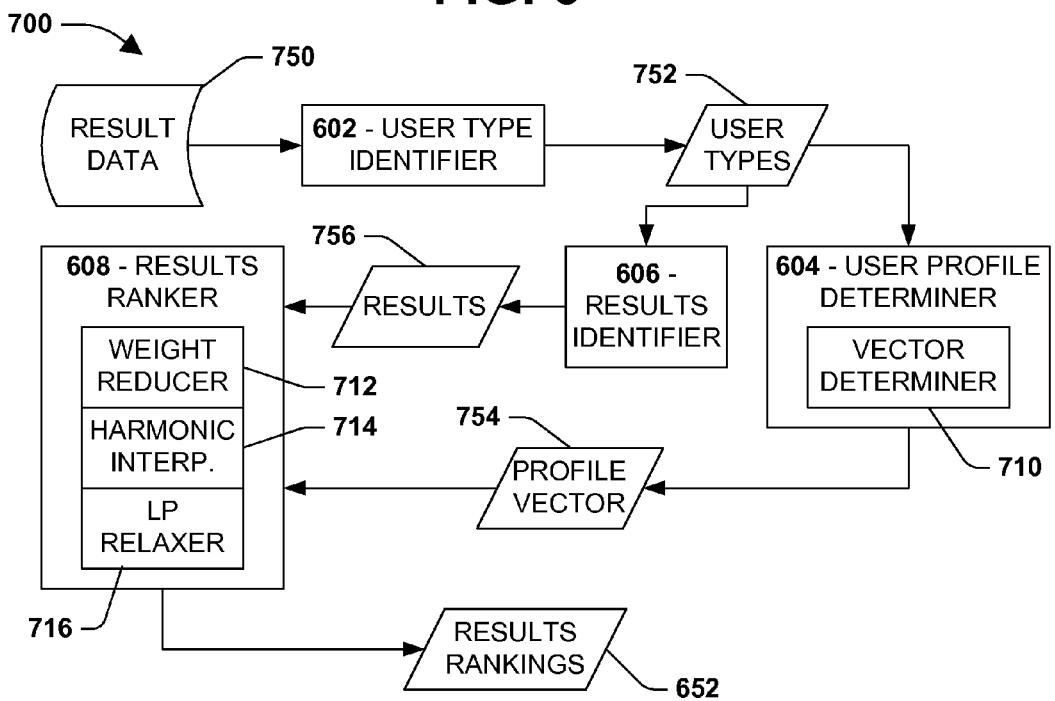
FIG. 7 is a component block diagram of one embodiment of a system for determining improved results rankings for a query.

FIG. 7 is a component block diagram of one embodiment 700 of a system for determining improved results rankings for a query. The user type identification component 602 is operably coupled to a database 750 of user, result-selection information that is collected from a plurality of user generated search-based queries. The user type identification component 602 can group a set of users into a user type 752 based on how many results the user selects to perform their desired task for the query, as determined from the database 750 of user, result-selection information. Further, the user type identification component 602 can group the set of users into a user-type 752 based on which results the user selects to perform their desired task for the query.

The user profile determination component 604 has a vector determiner 710 that determines a user profile vector 754 for a number of relevant results for the user type 752. The vector determiner 710 determines a probability distribution for the user type 752 that identifies a proportion distribution of users of that user type in the population of users of the search-based query. The results ranking component 606 determines sets of relevant results 756 for the respective user types 752, as described above.

The results ranking component 608 has a weight reduction component 712 that determines a ranking of the results 652 by selecting the result 756 that yields a desired user satisfaction metric for the desired number of users, where the vector is non-increasing over the distribution of user types for the number of selected results. The results ranking component 608 also has a linear programming relaxation component 716 that determines a ranking of results 652 by selecting a results ranking that has a desired satisfaction metric for the desired number of users, where the vector is non-decreasing over the distribution of user types for the number of selected results.

Further, the results ranking component 608 has a harmonic interpolation component 714 that is operably coupled to the weight reduction component 712. The harmonic interpolation component 714 adjusts the vectors 754 to spread a ranking weight of the respective vectors 754 in a non-uniform manner where the vectors are neither non-increasing nor non-decreasing. In one embodiment, the resulting adjusted vectors are sent to the weight reduction component 712, which determines a ranking of results 652 for the respective vectors.

Figure 8:
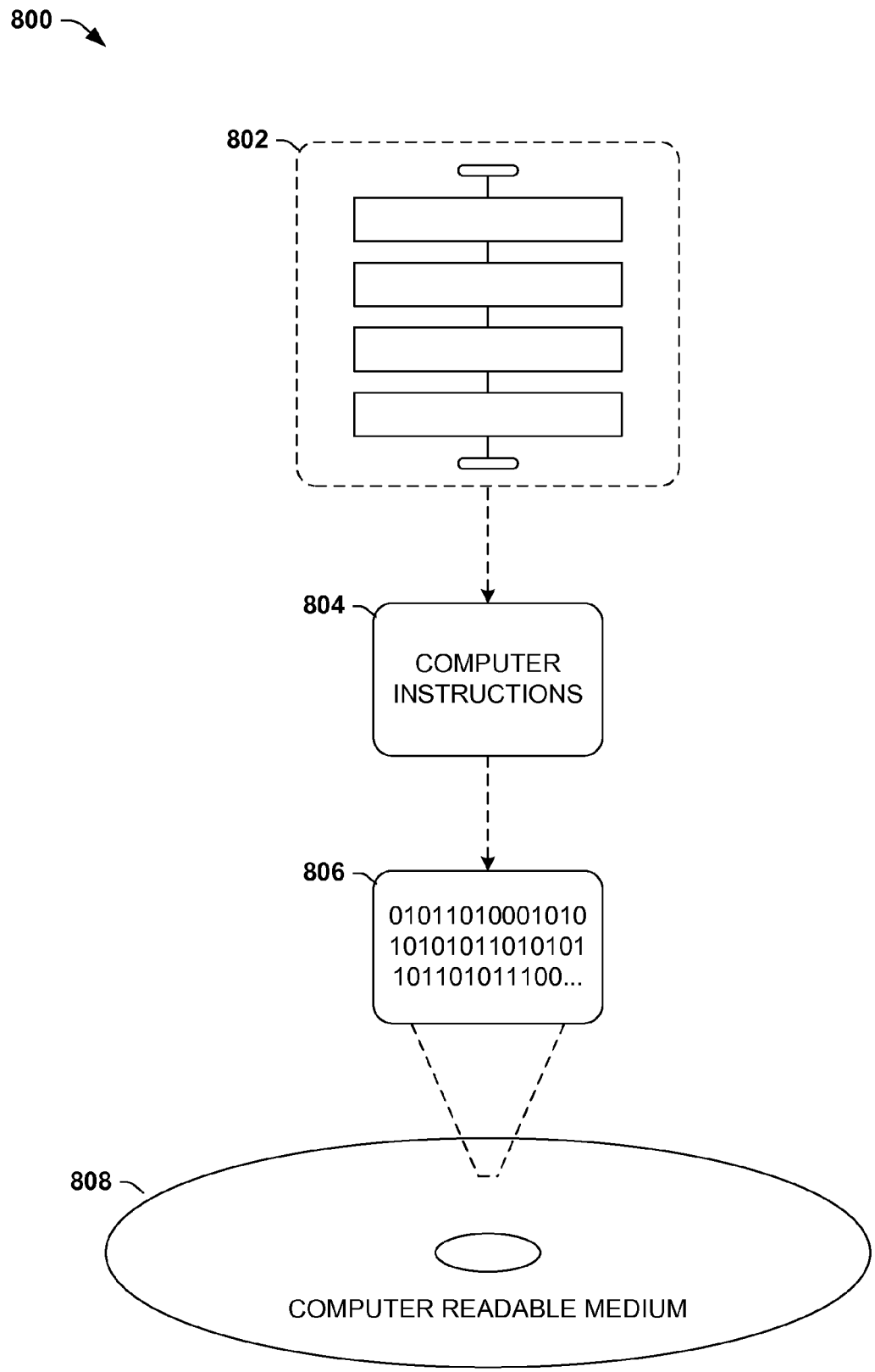
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 100 of FIG. 1, for example. In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
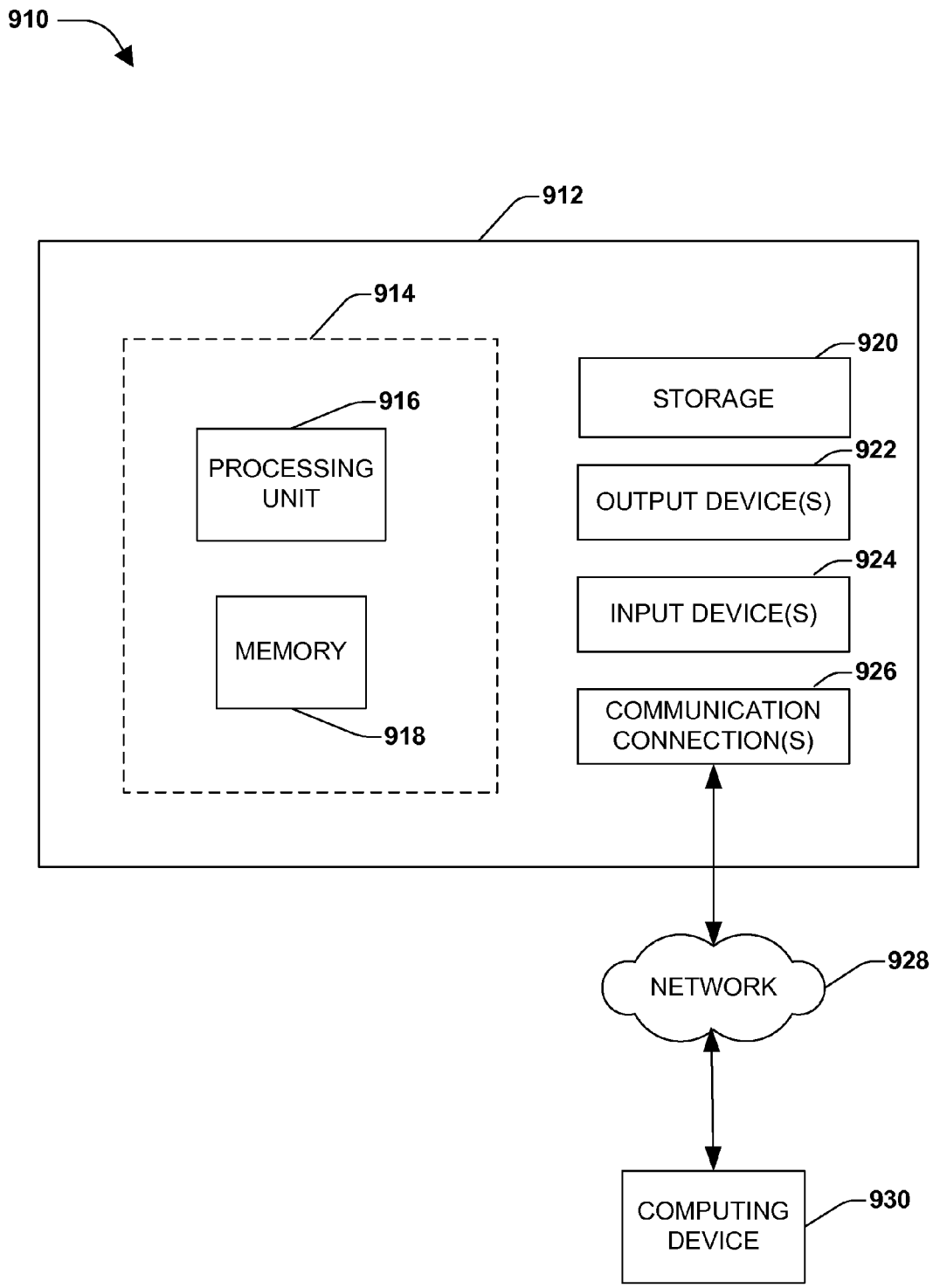
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for providing a ranking of results to a search-based query, comprising:
   one or more processors; and
   memory comprising instructions that when executed by at least one of the one or more processors, perform a method comprising:
      determining a first user profile for a first user type for the search-based query and a second user profile for a second user type for the search-based query;
      identifying a first set of results for the first user type for the search-based query based on a number of results utilized by the first user type;
      identifying a second set of results for the second user type for the search-based query based on a number of results utilized by the second user type;
      determining a vector representing a probability distribution for a user type, the probability distribution based on a proportion of one or more users of the user type in a population of users associated with the search-based query; and
      determining a ranking of results based on the vector, comprising:
         selecting a result from at least one of the first or second sets of results to be associated with a first rank of results for the search-based query; and
         selecting a result from at least one of the first or second sets of results to be associated with a second rank of results for the search-based query.

2. The system of claim 1, the selected results yielding a desired user satisfaction metric for a desired number of users.

3. The system of claim 1, the user type comprising at least one of the first user type or the second user type.

4. The system of claim 1, the determining the ranking of results comprising using a user profile weight.

5. The system of claim 1, the determining the ranking of results comprising using a user satisfaction weight.

6. The system of claim 1, the method comprising collecting user result-selection information associated with one or more user generated search-based queries to determine at least one of the first user profile or the second user profile.

7. The system of claim 1, the first user profile associated with a first vector associated with at least one result selected to perform a first desired task, the second user profile associated with a second vector associated with at least one result selected to perform a second desired task.

8. The system of claim 7, the determining the ranking of results comprising adjusting at least one of the first vector or the second vector to spread a ranking weight of at least one of the first vector or the second vector in a non-uniform manner.

9. The system of claim 7, at least one of the first vector or the second vector comprising two or more values.

10. A tangible computer readable storage device comprising instructions that when executed perform a method for providing a ranking of results to a search-based query, the method comprising:
   determining a first user profile for a first user type for the search-based query and a second user profile for a second user type for the search-based query;
   identifying a first set of results for the first user type for the search-based query based on a number of results utilized by the first user type;
   identifying a second set of results for the second user type for the search-based query based on a number of results utilized by the second user type;
   determining a ranking of results for the search-based query, comprising:
      selecting a result from at least one of the first or second sets of results to be associated with a first rank of results for the search-based query; and
      selecting a result from at least one of the first or second sets of results to be associated with a second rank of results for the search-based query; and
   adjusting at least one of a first vector associated with the first user profile or a second vector associated with the second user profile to spread a ranking weight of at least one of the first vector or the second vector in a non-uniform manner.

11. A method, implemented at least in part via a processing unit, for providing a ranking of results to a search-based query, comprising:
   determining a first user profile for a first user type for the search-based query and a second user profile for a second user type for the search-based query;
   identifying a first set of results for the first user type for the search-based query based on a number of results utilized by the first user type;
   identifying a second set of results for the second user type for the search-based query based on a number of results utilized by the second user type;
   determining a vector representing a probability distribution for a user type, the probability distribution based on a proportion of one or more users of the user type in a population of users associated with the search-based query; and determining a ranking of results based on the vector, comprising:

selecting a result from at least one of the first or second sets of results to be associated with a first rank of results for the search-based query; and selecting a result from at least one of the first or second sets of results to be associated with a second rank of results for the search-based query.

12. The method of claim 11, the selected results yielding a desired user satisfaction metric for a desired number of users.

13. The method of claim 11, the user type comprising at least one of the first user type or the second user type.

14. The method of claim 11, the determining the ranking of results comprising using a user profile weight.

15. The method of claim 11, the determining the ranking of results comprising using a user satisfaction weight.

16. The method of claim 11, comprising collecting user result-selection information associated with one or more user generated search-based queries to determine at least one of the first user profile or the second user profile.

17. The method of claim 11, at least one of the first vector or the second vector comprising two or more values.

18. The method of claim 11, the first user profile associated with a first vector associated with at least one result selected to perform a first desired task, the second user profile associated with a second vector associated with at least one result selected to perform a second desired task.

19. The method of claim 11, the determining the ranking of results based on a desired number of users selecting a result to perform a desired task in a desired amount of time.

20. The method of claim 11, the determining the ranking of results based on a proportion of users in the population of users associated with the search-based query selecting a result to perform a desired task.

* * * * *